US011063625B2

(12) United States Patent
Rappaport

(10) Patent No.: US 11,063,625 B2
(45) Date of Patent: Jul. 13, 2021

(54) STEERABLE ANTENNA DEVICE

(71) Applicant: Theodore S. Rappaport, Riner, VA (US)

(72) Inventor: Theodore S. Rappaport, Riner, VA (US)

( * ) Notice: Subject to any disclaimer, the term of this patent is extended or adjusted under 35 U.S.C. 154(b) by 1243 days.

(21) Appl. No.: 13/966,853

(22) Filed: Aug. 14, 2013

(65) Prior Publication Data
US 2013/0328723 A1   Dec. 12, 2013

Related U.S. Application Data

(63) Continuation-in-part of application No. 13/713,804, filed on Dec. 13, 2012, now Pat. No. 8,593,358, (Continued)

(51) Int. Cl.
| H04B 1/38 | (2015.01) |
| H01Q 1/24 | (2006.01) |
| H04B 1/3827 | (2015.01) |
| H04B 1/00 | (2006.01) |
| H01Q 3/24 | (2006.01) |
| H01Q 21/28 | (2006.01) |
| H01Q 5/335 | (2015.01) |
| H01Q 5/35 | (2015.01) |
| H01Q 5/357 | (2015.01) |

(52) U.S. Cl.
CPC .......... *H04B 1/3838* (2013.01); *H01Q 1/243* (2013.01); *H01Q 1/245* (2013.01); *H01Q 3/24* (2013.01); *H01Q 5/335* (2015.01); *H01Q 5/35* (2015.01); *H01Q 5/357* (2015.01); *H01Q 21/28* (2013.01); *H04B 1/0053* (2013.01)

(58) Field of Classification Search
CPC ...................................... H01Q 1/245

USPC .......................................... 342/368
See application file for complete search history.

(56) References Cited

U.S. PATENT DOCUMENTS 3,381,222 A   4/1968 Gray
3,689,928 A   9/1972 Felsenheld
(Continued)

OTHER PUBLICATIONS

P. Smulders, "Exploiting the 60 GHz Band for Local Wireless Multimedia Access: Prospects and Future Directions", IEEE Communications Magazine; Jan. 2002.*
(Continued)

*Primary Examiner* — Erin F Heard
*Assistant Examiner* — Helena H Seraydaryan
(74) *Attorney, Agent, or Firm* — W&C IP

(57) ABSTRACT

Wireless devices, and particularly mobile devices such as cellphones, PDAs, computers, navigation devices, etc., as well as other devices which transmit or receive data or other signals at multiple frequency bands utilize at least one steerable antenna, and may be configured to transmit and receive using plurality of different bands (e.g., GSM cellular communication band; Bluetooth short range communication band; ultrawideband (UWB) communications, etc.). These wireless devices can determine zones or spans of directions in which to avoid radiating beams at 10 GHz or above, and can receive signals on either the steerable antenna or another antenna. In addition, the wireless devices can be configured for radiating in a pattern that is different from the receiving pattern.

33 Claims, 5 Drawing Sheets

Related U.S. Application Data which is a continuation of application No. 12/541,764, filed on Aug. 14, 2009, now Pat. No. 8,350,763.

(60) Provisional application No. 61/088,829, filed on Aug. 14, 2008.

(56) References Cited

U.S. PATENT DOCUMENTS

| | | | |
|---|---|---|---|
| 4,499,606 A | 2/1985 | Rambo | |
| 6,140,966 A | 10/2000 | Pankinaho | |
| 6,381,471 B1 | 4/2002 | Dvorkin | |
| 6,456,856 B1* | 9/2002 | Werling | H01Q 1/243 455/129 |
| 6,560,443 B1 | 5/2003 | Vaisanen et al. | |
| 6,693,600 B1 | 2/2004 | Elliot | |
| 6,762,723 B2 | 7/2004 | Nallo et al. | |
| 6,865,376 B2 | 3/2005 | Forrester | |
| 6,957,081 B2 | 10/2005 | Leyh et al. | |
| 6,990,357 B2 | 1/2006 | Ella et al. | |
| 7,042,417 B2 | 5/2006 | Santhoff et al. | |
| 7,088,299 B2 | 8/2006 | Siegler et al. | |
| 7,132,989 B1 | 11/2006 | Poilasne | |
| 7,187,945 B2 | 3/2007 | Ranta et al. | |
| 7,403,164 B2 | 7/2008 | Sanz et al. | |
| 8,421,695 B2 | 4/2013 | Friman et al. | |
| 8,456,366 B2 | 6/2013 | Vance | |
| 2003/0151556 A1 | 8/2003 | Cohen | |
| 2004/0217909 A1* | 11/2004 | Maarala | H01Q 1/243 343/765 |
| 2006/0084395 A1* | 4/2006 | Kezys | H01Q 1/243 455/101 |
| 2007/0247385 A1* | 10/2007 | Brown | H01Q 13/10 343/770 |
| 2008/0158081 A1 | 7/2008 | Rofougaran | |
| 2008/0242349 A1* | 10/2008 | Rofougaran | H04M 1/72572 455/556.1 |
| 2008/0278405 A1 | 11/2008 | Montgomery et al. | |
| 2008/0318619 A1* | 12/2008 | Rofougaran | G06F 13/4234 455/550.1 |
| 2009/0295648 A1* | 12/2009 | Dorsey | H01Q 1/2266 343/702 |
| 2010/0060531 A1* | 3/2010 | Rappaport | H01Q 1/243 343/702 |
| 2013/0040655 A1 | 2/2013 | Keidar | |
| 2016/0103199 A1 | 4/2016 | Rappaport | |

OTHER PUBLICATIONS

Duplexing Techniques, VistaMAX, WiMAX, IEEE 802.16-2004; https://www.streakwave.com/vecima/vistamax_dplxtech%20_wp_02.pdf (Year: 2004).*

M. Alkanhal, et al., "A novel dual-band reconfigurable square-ring microstrip antenna", Progress in Electromagnetics Research, 2007, pp. 337-349, vol. 70.

M. Azad, et al., "A Miniaturized Hilbert PIFA for Dual-Band Mobile Wireless Applications", IEEE Antennas and Propagation Letters, 2005, pp. 59-62, vol. 4.

A. Sayem, et al., "Characteristics of a microstrip-FED miniature printed Hilbert slot antenna", Progress in Electromagnetics Research, 2006, pp. 1-18, vol. 56.

G. Zhao, et al., "Compact ring monopole antenna with double meander lines for 2.4/5 GHz dual-band operation", Progress in Electromagnetics Research, 2007, pp. 187-194, vol. 72.

T. Rappaport et al., Millimeter Wave Wireless Communications, Chapter 1, 2015 Prentice Hall.

T. Rappaport et al., "Wideband Millimeter-Wave Propagation Measurements and Channel Models for Future Wireless Communication System Design," IEEE Transactions on Communications, Sep. 2015, pp. 3029-3056, vol. 63, No. 9.

T. Rappaport et al., "Millimeter Wave Mobile Communications for 5G Cellular: It Will Work!", IEEE Access, May 2013, pp. 335-349, vol. 1.

* cited by examiner

STEERABLE ANTENNA DEVICE

CROSS-REFERENCE TO RELATED APPLICATIONS

This application is a continuation-in-part (CIP) of U.S. patent application Ser. No. 13/713,804, filed Dec. 13, 2012, which is a continuation of U.S. patent application Ser. No. 12/541,764, filed Aug. 14, 2009, now issued U.S. Pat. No. 8,350,763, which further claims priority to U.S. Provisional Application Ser. No. 61/088,829, filed Aug. 14, 2008. The complete contents of all three references are hereby incorporated by reference.

BACKGROUND OF THE INVENTION

Field of the Invention

The present invention relates to wireless portable devices and particularly to improvements in transmitting and receiving electromagnetic signals at multiple frequency bands.

Background of the Invention

Today's wireless devices, such as laptops and computers that connect wirelessly to the cellphone network or internet must use antennas to transmit and receive wireless energy to and from the device. Today's cellphones and laptops typically require multiple antennas, each antenna designed for resonance or desired performance at a particular frequency band (such as cellular band, say in the 850-950 MHz band, the Bluetooth/WiFi band, say in the 2400-2490 MHz band, and so on). Computer makers and cellphone makers have difficulty with the mechanical design of their equipment, and spend a great deal of engineering time, research, and cost in manufacture for the bill of materials for the feedlines and connections between transmitter circuits, transceiver circuits, or receiver circuits and the antennas that are mounted to or housed in the wireless device casing. In some cases, antennas must be oriented in the flip up top of a laptop or placed behind or in the display screen, and tiny coaxial cables run through the case hinges to the motherboard mounted below the keyboard. Similar problems exist with cellphones, and all devices generally must meet or exceed certain federal or wireless carrier-imposed requirements for radiation efficiency for a wide range of device orientations. It is envisioned that as wireless proliferates, cellphones and laptops will require more and more separate radio frequency bands in order to offer connectivity and competitive services. It is not inconceivable to eventually have wireless portable devices requiring 10 or more separate frequency bands, where the term "band" here means a particular wireless standard or service that is distinct from another. For example, standards such as IEEE 802.11a, 802.11b, 802.11g, 802.15a, 802.15.3.c, Cellular telephone (European, Asian, or US spectrum), Bluetooth, WiMax, and PCS all represent different bands, as they generally have different RF frequency band allocations assigned to them. In the future, RFID tags, vehicles, wireless post it notes, equipment, shipping containers, and even clothing may also suffer the issue of having to provide multiple antennas for different RF bands.

Today, there are many passive antennas solutions that have been published in the literature, such as, for example, the broadband planar antenna developed by Professor Chen at The University of Texas. Using Fractal programming (genetic algorithms), it is possible to do computer simulations that eventually create an antenna design that offers resonance for several different frequency bands. Such antennas generally are developed by using field solver programs, where the field solver is set to optimize an antenna structure for a particular antenna performance over a specified range of frequencies (for example, the field solver may be set to find an antenna structure that has a low return loss, S11, of less than −13 dB over the range of frequencies of 2.4-2.9 GHz and 5.1-5.8 GHz, in order to accommodate Bluetooth and WiFi 802.11a, 802.11b, and 802.11g). However, planar antennas, when designed by an optimization program or set of algorithms, without the use of active antenna tuning, may result in a larger antenna than what is feasible for a small package (e.g. a small handset or mobile device).

Recently, there have been some technical advances in active antenna tuning, some of which have been pioneered by Paratek Microwave in Nashua, N.H. Using active lumped elements, such as tunable capacitors, it is possible to allow for the active tuning of an antenna within a cellphone handset. Using electrically tunable capacitors, Paratek has pioneered a way to allow for active tuning of one or more cellphone antennas, as discussed in U.S. Pat. No. 7,369,828.

In U.S. Pat. No. 7,369,828 by Shamsaifar (owned by Paratek Microwave), the device can tune two different cellphone antennas for use on one of several bands of interest, where each distinct and separate antenna (one for high band and one for low band) has an active element that may be tuned. As described in U.S. Pat. No. 7,369,829, a cellphone antenna is designed specifically for cellphone bands, since today's cellphones generally provide a small Bluetooth antenna, separate and apart from the cellular antenna. In U.S. Pat. No. 7,369,829, there is described a method of transmitting and receiving RF signals from multiple frequency bands utilizing an electronically tunable multiple band antenna, comprising the steps of: providing a high band antenna with at least one voltage tunable varactor associated therewith, the high band antenna providing a first input to a controller; providing a low band antenna with at least one voltage tunable varactor associated therewith, the low band antenna providing a second input to the controller; and inputting control data to the controller and controlling a first bias voltage for biasing the at least one voltage tunable varactor associated with the high band antenna and a second bias voltage for biasing the at least one voltage tunable varactor associated with the low band antenna. By using a controller, the invention enables an antenna to be tuned.

The controller of the method in U.S. Pat. No. 7,369,828 can use a DC voltage supply to provide the DC voltage needed to bias the voltage tunable varactors. The high band antenna of the method taught in U.S. Pat. No. 7,369,828 can further comprise: a substrate; a patch element on the substrate; at least one voltage tunable varactor associated with the patch element; a DC bias point on the patch element; an RF input on the patch element; a temperature sensor; and a ground plane on one side of the substrate.

The low band antenna of the method taught in U.S. Pat. No. 7,369,828 can further comprise: a substrate; a patch element on the substrate; at least one voltage tunable varactor associated with the patch element; a DC bias point on the patch element; an RF input on the patch element; a temperature sensor; and a ground plane on one side of the substrate.

In a more specific embodiment of a preferred method of U.S. Pat. No. 7,369,829, the multiple band antenna is a quad band antenna and covers the following frequency bands and standards which only involve cellular telephone (cellular and PCS): 824-894 MHz; 880-960 MHz; 1710-1880 MHz; 1850-1990 Hz; GSM850; EGSM; GSM1800; and PCS 1900.

Paratek uses BST as a tunable dielectric material that may be used in a tunable dielectric capacitor. Paratek Microwave, Inc. has developed and continues to develop tunable dielectric materials that may be utilized in embodiments of the antenna tuners and tunable filters, and the tuners are not necessary limited to using BST material. This family of tunable dielectric materials may be referred to as Parascan by the company.

The term "Parascan" as used herein is a trademarked term indicating a tunable dielectric material developed by Paratek Microwave, the assignee of U.S. Pat. Nos. 7,397,329 and 7,369,828, and the idea of tunable dielectric materials have been described in several patents. Barium strontium titanate ($BaTiO_3$-$SrTiO_3$), also referred to as BSTO, is used for its high dielectric constant (200-6,000) and large change in dielectric constant with applied voltage (25-75 percent with a field of 2 Volts/micron).

Tunable dielectric materials including barium strontium titanate are disclosed in U.S. Pat. No. 5,312,790 to Sengupta, et al. entitled "Ceramic Ferroelectric Material"; U.S. Pat. No. 5,427,988 by Sengupta, et al. entitled "Ceramic Ferroelectric Composite Material-BSTO-MgO"; U.S. Pat. No. 5,486,491 to Sengupta, et al. entitled "Ceramic Ferroelectric Composite Material-BSTO-$ZrO_2$"; U.S. Pat. No. 5,635,434 by Sengupta, et al. entitled "Ceramic Ferroelectric Composite Material-BSTO-Magnesium Based Compound"; U.S. Pat. No. 5,830,591 by Sengupta, et al. entitled "Multilayered Ferroelectric Composite Waveguides"; U.S. Pat. No. 5,846,893 by Sengupta, et al. entitled "Thin Film Ferroelectric Composites and Method of Making"; U.S. Pat. No. 5,766,697 by Sengupta, et al. entitled "Method of Making Thin Film Composites"; U.S. Pat. No. 5,693,429 by Sengupta, et al. entitled "Electronically Graded Multilayer Ferroelectric Composites"; U.S. Pat. No. 5,635,433 by Sengupta entitled "Ceramic Ferroelectric Composite Material BSTO-ZnO"; U.S. Pat. No. 6,074,971 by Chiu et al. entitled "Ceramic Ferroelectric Composite Materials with Enhanced Electronic Properties BSTO Mg Based Compound-Rare Earth Oxide". These patents are incorporated herein by reference. The materials described in these patents, especially BSTO-MgO composites, show low dielectric loss and high tenability. Tunability is defined as the fractional change in the dielectric constant with applied voltage.

Using the idea of tunable capacitance, and following on the above listed prior art, Paratek Microwave has developed a technology called Adaptive Impedance Matching Models (AIMM) which it currently demonstrates on its website at worldwide web site paratek.com as able to adaptively tune antennas.

Agile Materials, a company founded in 1999 as a spinoff of University of California, Santa Barbara, has also developed tunable wireless components for multi-band systems. Agile has successfully commercialized its proprietary method to harness the unique properties of a thin-film ferroelectric capacitors, which may be tuned over at least an octave of frequency range. Agile employees produced U.S. Pat. No. 7,202,747, "Self Tuning Variable Impedance Circuit for Impedence Matching of Power amplifiers,", as well a U.S. Pat. No. 7,012,483, "Tunable Bridge Circuit", both of which use a BST tunable capacitive material to affect a resonance change in a tuneable circuit. All of the aforementioned is known from the public prior art of record.

SUMMARY

The current invention uses one or more antennas, at least one of which can be used by multiple transmitters or receivers in different bands, thereby greatly simplifying the antenna structures in a portable wireless device, and greatly reducing the mechanical design complexity, the cost of bill of materials, and the variance in manufacturing of different devices of a particular model.

The current invention exploits the idea of active antenna tuning, but expands it greatly in a non-obvious way by applying the concepts to the situation of where multiple band transmitters, receivers, or transceivers must be used simultaneously in a wireless portable device. In cellphones today, since telephone call need only be made on one band at a time (either on High Band Cellular or Low Band Cellular, or 3G band, but not more than one at a time), U.S. Pat. No. 7,369,829 and other prior art have not contemplated the present invention, which allows a single antenna to be used for simultaneous transmission (or reception) for multiple bands. The present invention greatly simplifies the mechanical design and layout of wireless portable devices by allowing multiple transmitter (or receiver) bands to simultaneously use one or more antennas for simultaneous multi-purpose use.

This invention allows an antenna, such as a patch or metal fixture or other type of conductive or non/semi-conductive element or elements mounted on or within a mobile or portable device, to be simultaneously fed and used by multiple transmitters, receivers, or transceivers on different bands. It is understood that the terms portable and mobile may be used interchangeably. The invention has application with all wireless devices whether mobile, portable or fixed. This invention exploits active tuning and matching for each of the feedlines to antennas, or may use a single antenna feedline to match a single or multiple antenna from multiple devices, using tunable technologies developed by Paratek Microwave, Agile, or others, as well as techniques described below, or by using signal processing in the RF or IF domains, as well. The invention also allows a steerable antenna within a wireless device to avoid radiating towards a person or object.

DETAILED DESCRIPTION

Figure 1:
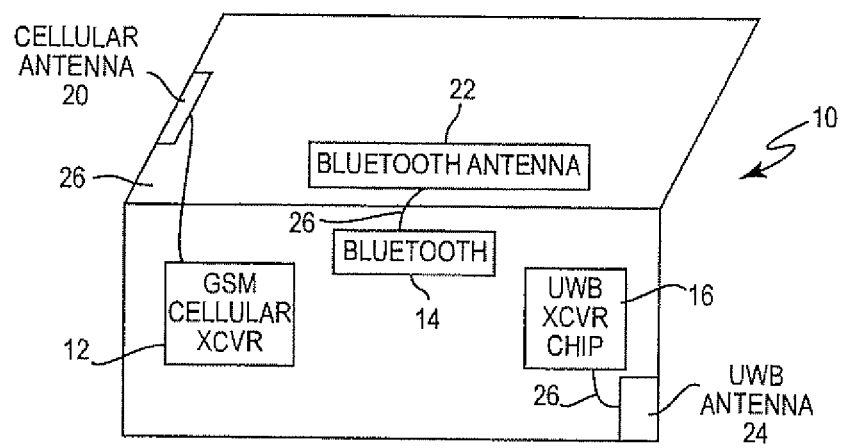
FIG. 1 shows today's typical cellphone or laptop design, where different transceivers are connected to different antennas.

Shown in FIG. 1 is an example of how cellphones or laptops or other wireless devices 10 are designed today. In general, different band transceivers (e.g., GSM cellular transceiver 12, Bluetooth transceiver 14, and ultrawideband transceiver 16) are connected to different antennas (e.g., cellular antenna 20, Bluetooth antenna 22, and UWB antenna 24) that must be affixed to, located within the packaging of the device, or included in the printed circuit boards of the device, thereby taking up space, feedline resources (e.g., feedlines 26), increasing the bill of materials, and adding complexity.

Figure 2:
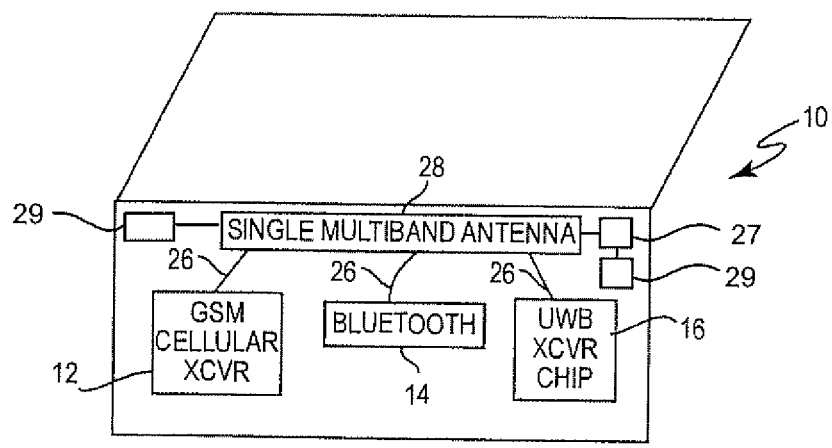
FIG. 2 shows an embodiment of the present invention, where multiple transmitters are fed to a single antenna (it is understood that transmitters could also be transceivers, or receivers).

FIG. 2 illustrates the basic idea of the present invention which can be implemented in fixed or mobile wireless devices 10 such as computers, telephones, portable computing or communication devices, games, wireless post it notes, wireless memory media, personal data assistants and navigation assistants. For the purposes of this disclosure, the term "mobile wireless device" may be used interchangeably with "portable wireless device" and "wireless portable device". One potential application of the invention is in the IEEE 802.11ad standard, where very high throughput wireless devices (e.g., 60 GHz carrier transmissions) may use one or more transmitters, receivers or transceivers to simultaneously provide capabilities in the existing 802.11a and 802.11b bands of 2.4 GHz and 5.8 GHz, as well as the 60 GHz spectrum. Instead of requiring different antennas for the different RF bands, the present invention allows for the use of a single antenna 28 for multiple bands (or multiple antennas, at least one of which can be used for multiple bands, and at least one of which may be a steerable antenna, where a steerable antenna may steer or direct its energy in particular directions while providing nulls or dead zones in other directions, and may be used on one or more bands). By providing the ability to use just a single antenna 28, the problem of mounting, locating, and feeding the antenna can be greatly reduced, so long as a desired antenna efficiency can be maintained for all bands of interest.

Figure 3:
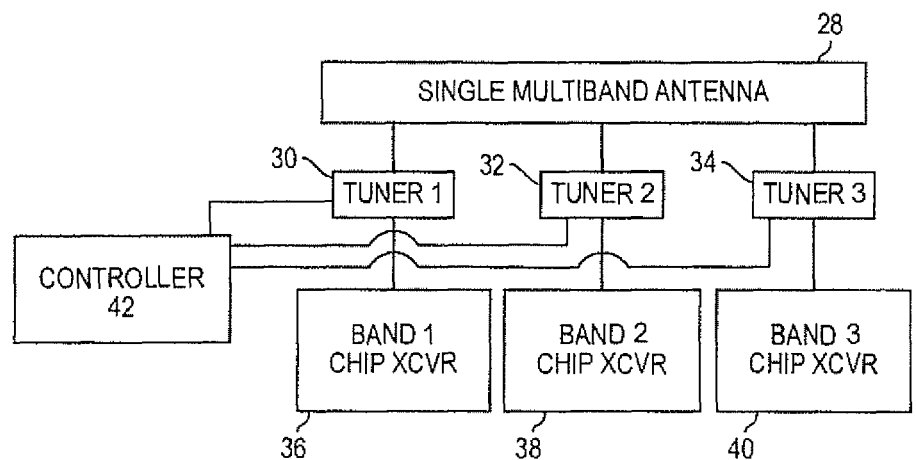
FIG. 3 shows a more detailed embodiment of the present invention, where multiple transmitters may be fed to a single antenna using multiple feedlines and active antenna tuners, controlled by a controller, operates on the RF of each signal. (it is understood that transmitters could also be transceivers, or receivers).

FIG. 3 shows how the antenna efficiency can be maintained. By using individual RF tuners 30, 32, and 34, that may be based on Paratek's or Agile's technology, or any other active tuning method, such as Microelectrical Mechanical Systems (MEMS), or variable mechanical resonator technologies, or other active or passive methods known now or in the future, it becomes possible to provide a good impedance match for each of the transceivers 36, 38 and 40 shown in FIG. 3. The key to proper operation is to also, while providing good matching, provide sufficient RF isolation so that the transmitters in other bands do not overload the front end receiver of a band that is receiving. Fortunately, RF filtering and overload protection is improving in commercially available wireless transceivers in various popular bands, so that overload protection may be offered within the wireless transceiver chip itself through the integrated circuitry. Where more isolation is required, the tuner for a particular band is adjusted to offer very high impedance S22 characteristics at the other bands that differ from the dedicated band of the tuner, so that there is little, if any energy returned to the desired transceiver (or transmitter, or receiver) of the particular band of the tuner. In addition, low cost LC circuits may be etched into and/or added on the circuit board during manufacture or otherwise made a part of the tuner circuitry in order to create an RF Trap for the other bands, at much less cost and reduced engineering than having to use separate antennas for each band.

Furthermore, it is possible to use band transceivers that offer different antenna ports for the transmitter and the receiver within a particular band, whereby the present invention is simply extended to where there are two antennas used—one that is used solely for transmission by the multiple bands, and another multiband shared antenna for the receiver that is located a sufficient distance away within the casing, or which uses polarization diversity, or uses shielding or distributed antenna ideas within the case in order to reduce the RF overload from the transmitting antenna. The receiving antenna, for instance, might be mounted on the other side of the printed circuit board for the cellphone, or laptop, or RFID tag, or wireless post-it, or might be pitched at right angles in the casing, etc. It is also possible to use buffer amplifiers, tuned amplifiers, as well as tuned trap circuits for particular offending bands, that can act as filters to prevent RF from other multi-user band transmitters from leaking into the receiver portion of a particular band. Also, RF antenna switches, may be made inexpensively in an integrated circuit process in CMOS, GaAs, or other well known semiconductor technologies known now or the future. These capabilities which may be incorporated in the tuner as described below. It should be clear in this disclosure that the term "antenna" is not meant to be limiting to any particular structure, but rather is meant to represent all of the possible ways that a wireless portable device may allow for radiation and reception of electromagnetic energy from particular frequency bands of interest.

FIG. 3 also shows a tuner controller 42, preferably digital in nature and which may be part of a computer or microprocessor circuit that also controls one or more of the transceivers (or transmitters or receivers) shown in the figure. The controller 42 provides the proper voltages, or more preferably, the digital control values that are used by the tuner in order to adjust the active elements of the tuner (e.g. the tunable capacitors, inductors, amplifiers, and to toggle switches). The digital decoding circuitry in the tuner is not shown here, but is known to be implemented in a number of ways using standard serial or parallel digital busses that interconnect integrated circuits within cellphones and laptops. Furthermore, the controller receives feedback from the tuner, or from other circuitry (not shown) with respect to VSWR, power, and proper functionality so that the controller may properly adjust, alter, initiate, and end its use of control signals (either voltages or data values sent over a serial data line or a bus) to the tuner. In the case of the tuner receiving digital signals from the controller, it is understood that the tuner would have its own processing that would allow for the digital interpretation of control signals such as to properly determine the necessary analog voltages or other signal adjustments needed to perform impedance tuning through adjustment of the active tunable elements of the tuner, so that it would be possible to sequentially or simultaneously tune one or more of the tuners so that multiple bands may simultaneously transmit (or receive, or both) using the single antenna structure shown in the figure. The controller may be part of the overall portable device computing logic or controlling circuitry, or may be integrated within one or more of a particular band or multiband transceiver, transmitter, or receiver. The controller may be distributed within the portable device, and may even be responsive to over the air signaling that is received by one or more of the transceivers. The controller would have awareness of when particular bands were to be transmitting, receiving, or in the idle/off mode, so that it could properly control the active elements, and even provide power on/off/sleep instructions to the circuitry within the tuner. Note that nothing here is meant to be limiting in how the controller might be used, as it is conceivable that it could be included in the circuitry of the tuner, or the tuner and controller ideas contemplated here all could be integrated within a single multiband transceiver chip, such as is shown in FIG. 4.

Figure 4:
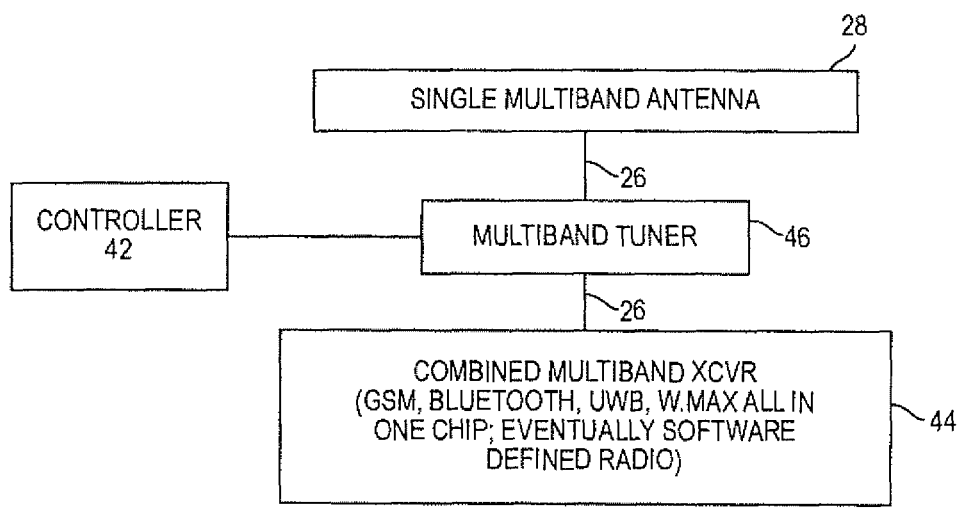
FIG. 4 shows another embodiment of the present invention, where multiple transmitters may be fed to a single antenna using a single feedline and a single active antenna tuner which is controlled by a controller.

FIG. 4 shows an alternate embodiment, where the progress in IC design for wireless multiband, multi-mode circuits is contemplated. Indeed, today it is possible to purchase multi-band transceiver chips for popular wireless standards where different antenna ports are provided for various RF output bands. FIG. 4 illustrates the use of a combined multiband transceiver 44 which may include, for example, GSM, Bluetooth, UWB, WiMAX all on one chip—eventually software designed radio may be a part of the chip). The present idea, shown in FIG. 4, using a single RF feedline to a single multiband active controller, would provide an advantage to the wireless industry through simplicity and reduced feedlines, reduced size and weight, and more flexibility in locating the antenna. The multiband tuner 46 would require greater complexity than as shown in FIG. 3, as it would require the ability to simultaneously pass desired RF signals at proper low (generally 50 ohms to 600 ohms) impedance for each of the bands that are being used, while providing very high impedance to other bands. The tuner is adjusted by the controller in order to indicate when a particular transmitter on a particular band is in the transmit mode or in the receive mode, or, alternatively, the tuner could simply offer matching capabilities to a transmitter to the antenna without consideration for the receiver (for the case where the receiver would be connected to a different antenna). The circuitry of the tuner is described in more detail below, and can exploit buffer amplifiers or tuned RF amplifiers at various RF frequencies to provide isolation, as well as antenna switching, all contained within the tuner, making it possible to create a low cost, high performance antenna tuner chip for the present application. An optional RF switch allows separate transmitter path and receiver path tuning for each of the bands at use. This concept may be included within a single band tuner element for the present invention.

Figure 5:
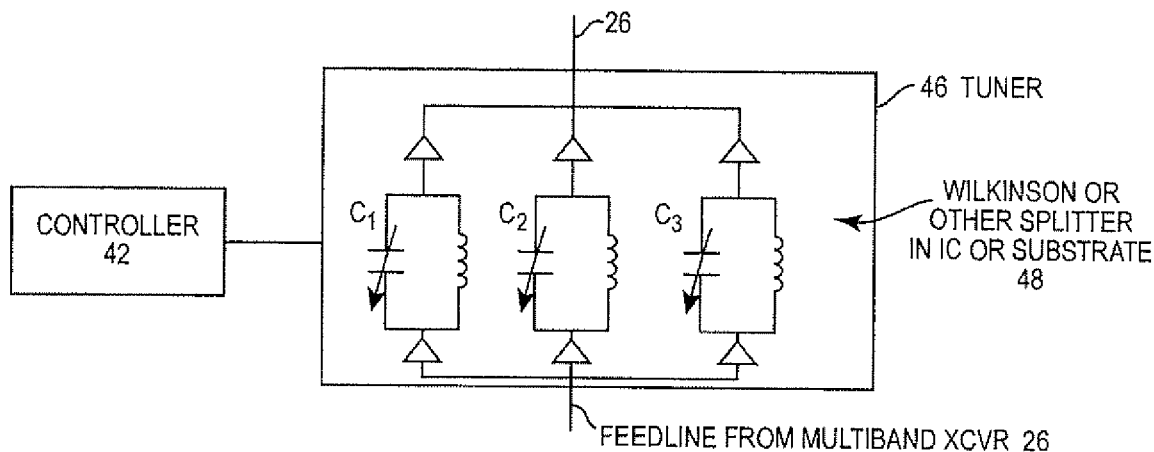
FIG. 5 shows yet another alternate embodiment of the present invention, where a multiband tuner provides matching from a single multiband transmitter (or transceiver or receiver) feedline (e.g. a single RF source) to a single multi-use multi-band antenna FIGS. 6A, B, and C illustrate some of the possible examples and configurations of tuning elements and circuits used within a tuner, with active elements, or in a multiband transceiver.

FIG. 5 illustrates a more detailed example of the active and passive circuitry of the present invention. To provide a single feedline to a single antenna, the tuner 46 requires controller circuitry that provides instructions as to how the particular active devices may be adjusted. In this case, the term active indicates that RF tuning is possible, such as in the case of tunable capacitors or tunable inductors. FIG. 5 shows an example, not in any way meant to be limiting to the type of impedance matching circuits 48 contemplated here, where the capacitors of each of three parallel band tuners are able to be tuned. Tuning methods for capacitors are well known, such as taught in the prior art patents by Paratek, and by researchers throughout the world. Similarly, it is possible to tune inductances, as well. Furthermore, shown in FIG. 5, it is noted that RF amplifiers, that may be used to either offer matching impedance at the input (say 50 ohms) and particular desired impedance at the output feedline to the antenna, is shown. It should be clear that RF amplifiers, as shown in FIGS. 5 and 6, may either be strict buffer amplifiers with a very high output impedance, or alternatively, may be active devices that have a controlled impedance that is adjusted in tandem with the tuned circuit elements shown in the figures. FIG. 5 represents an example of how multiband transmitted signals may be applied to a single multiband tuner. The input signals are split and routed to each of the respective tuner circuits, and may use a Wilkinson or simple ohmic splitter, which may implemented either on a printed circuit board substrate or within an integrated circuit. It is clear to one skilled in the art that tuner circuits and feedlines may be implemented in a myriad of ways depending on the particular physical structure of the circuitry. For example, coplanar waveguides or microstrip lines may be used in integrated circuits or circuit boards, and splitters, combiners, couplers, mixers, and switches may be fabricated to realize the invention using well understood techniques such as taught in D. Pozar's books Microwave Engineering, copyright 2004, and Microwave and RF Design of Wireless Systems, copyright 2000 which are hereby incorporated by reference, and as presented at various IEEE conferences on antennas, microwave theories, and circuits.

While techniques for building both active and passive circuits are taught at various conferences, the use of such technology for the present invention has not been heretofore contemplated. It is well understood that a wide range of active and passive components, either lumped or distributed, may be combined with various transmission line and active and passive signal coupling techniques to implement the invention.

Figure 6A:
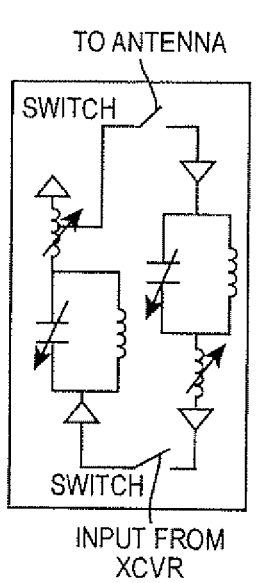
Figure 6B:
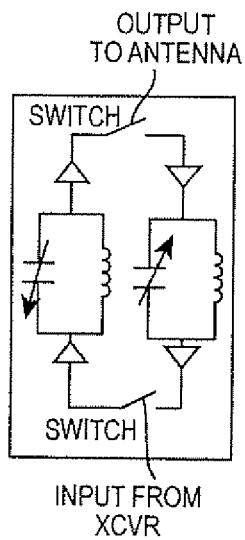
Figure 6C:
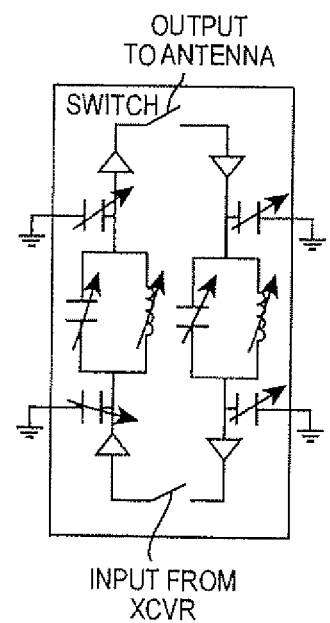

FIGS. 6A, B, and C illustrate some of the possible configurations of tuner elements for use in a multiband transceiver. It should be understood that these are representative, and other combinations of lumped or distributed circuits are possible, where the proper choice would depend on the type and structure of single antenna to be used, the electrical specifications and impedance matching/antenna port/isolation capabilities of the transmitter, receiver, or transceiver chips being used in the portable device, as well as cost, bill of materials, and the type of mounting to be used for the tuner circuitry. That is, an integrated circuit tuner might be more likely to pick adjustable capacitors over adjustable inductors in some instances.

Note in FIGS. 6A, B, and C that there are optional RF switches, that may be implemented in integrated circuit form within the tuner circuitry, that can be controlled by the controller to position properly for either transmit or receive operation. The transmitter configuration would exploit the left side of each of the depicted tuners, with a path providing matching to the single antenna structure, where the right side of each depicted tuner would be used for matching provided on the receive path. The switch would be controlled by the controller, or by some other means, such as from a master controller of the wireless device, the transceiver chip, or some other logic that instructs the particular transmitter in the particular band to transmit. Alternatively, the switches could be controlled by RF sensing, whereby the presence of sufficient level of RF from the transmitter (transceiver) chip causes the switches at the top and the bottom of the depictions to throw properly.

The active (tuned) elements shown in FIGS. 6A, B, and C, suggest that one or more tuned elements may be used in a tuner as disclosed here. For example, one method would only use tunable capacitors, which are available from Paratek Microwave. Other embodiments would use both tunable capacitors and tunable inductors, and still others may use a combination of tunable and fixed elements in order to provide antenna tuning of a particular band to a single antenna while providing sufficient RF isolation/rejection of unwanted bands.

For simplicity, the controller signal in the circuitry shown in FIGS. 6A, B, and C is omitted, but it should be clear that such signaling capability exists. Other features have also been omitted, such as temperature sensors to determine proper electrical characteristics and calibration of the tuned elements, feedback circuitry (to sense proper VSWR, impedence, or acceptable power transfer, sufficient isolation), but these concepts are well understood by those skilled in the art.

It should also be clear that optimization algorithms that determine the values of multiband tuners so as to properly determine each of the active element positions could be performed by the controller as depicted in this invention disclosure. The optimization could use pre-set or memorized settings from recent or long term histories of proper tuning values, or could determine, on start up of the wireless device, appropriate values for the settings of each tuner elements. Such computation techniques, to determine a matrix of various values in a multidimensional problem, are well known and are varied. The use of memory to remember preset values for various use cases, and to store new or recent or past settings of tuner elements, in order to allow the invention to be used in a power efficient and reliable manner is contemplated here, although memory is not shown in the drawings. These techniques are well understood in the art.

In addition to the active tuned elements shown in FIGS. 6A, B, and C, it is possible to implement the invention using other frequency selective approaches, such as reasonably high-q passive circuits (with or without amplification), or using metamaterials or transmission line implementations which may be embedded within one or more semiconductor layers or substrates, or implemented in lumped element form, or through active and/or passive circuitry to provide the ability to provide either receiver or transmitter antenna tuning on multiple bands, as described above. Metamaterials are one way to create frequency selective surfaces and can provide good isolation, as described in the paper coauthored by L. Ragan, A. Hassibi, T. S. Rappaport, and C. L. Christianson, entitled "Novel On-Chip Antenna Structures and Frequency Selective Surface (FSS) Approaches for Millimeter Wave Devices," IEEE 66th Vehicular Technology Conference (VTC), Baltimore, Md., Oct. 1-3, 2007, pp. 2051-2055, and as described in US patent publication 20080238801 by Lawrence Ragan, both of which are fully incorporated here by reference. Such frequency selective structures and implementations, depending upon the particular implementation, may require amplifiers or may be of sufficiently low loss to obviate the need for amplifiers directly at the antenna tuner junction. The controller would cause various switches, devices, or series or parallel (or both) combinations of connections, or would otherwise support voltages or currents to be established in order to implement or select the desired tunability for these various possible implementations, it being understood that the controller could be designed to work in concert with various semiconductor properties, or with embedded, distributed or lumped circuitry within the RF stage or antenna interconnect stage, in order to affect the ability to use a single antenna on multiple bands.

As wireless devices begin to evolve to millimeter wave (mmWave) carrier frequencies above 10 GHz, say at 28 or 38 GHz, and even to frequencies in the 70 to 500 GHz range, and even to Terahertz frequencies, the need to integrate the tuning and interconnection of a single antenna to RF circuitry will become even greater. System on a chip (Soc) implementations of the invention described here will be highly desirable so that a single integrated circuit, with an embedded antenna on the integrated circuit (chip) or package or on the case or circuit board of a consumer device (such as a PC, cellphone, television, vehicle, etc.) may be used for several different frequency bands, or for different portions of a massively wideband spectrum allocation. For example, 60 GHz devices may well work from 58 to 65 GHz, and it will be desirable to implement the current invention across different portions of that band (e.g. the same antenna may need to be tuned for the 58-60 GHz portion of the band for one particular application or instance, and the 62-64 GHz portion of the band for a different application or instance, or may also be used to tune to the 77 GHz band or 5.1-5.8 GHz band for operations, as well.). Ultrawideband repeaters, such as described in U.S. patent application Ser. No. 10/919,515, now issued U.S. Pat. No. 7,676,194 to Rappaport, which is fully incorporated here by reference, could make use of this. It is understood that the controller may selectively switch, exit, or cause voltages or currents or switches to be activated in any particular implementation, and that the single antenna may itself be designed to have certain desirable properties or preferential frequency responses at certain different bands, but which are further improved and made to more efficiently transfer power (e.g. reduce the Voltage Standing Wave Ratio, increase efficiency, tune for improved SNR, decrease power or current drain, or improve some other power transfer metric, all of which are examples of matching the antenna to the other circuitry including without limitation the transmitters, receivers, and transceivers) between the antenna and the transmitter and/or receiver through the disclosed invention.

Using the concepts of adaptive or steerable antennas of multiple elements, wireless communication systems and devices in the millimeter wave (mmWave) bands (for example, above 10 GHz in frequency, where directional antennas may be fabricated using antenna elements much smaller than used in today's 2 GHz cellphones) will be able to exploit the steerable properties of such antennas for improved performance and safety of the user.

In future mmWave communication systems, portable devices and/or fixed infrastructure, such as base stations, and/or "access points" or repeaters, or other infrastructure devices will use directional, steerable antennas for advantage. It is useful to steer radiation energy of a portable or fixed device away from a person's head, or body, or building or obstruction of some kind. This is desirable for at least two reasons. First, portable wireless devices should radiate away from a body of a person (or structure) because a body may often attenuate or interfere with an intended radiation signal of such a device.—It is often advantageous to radiate energy away from a person or structure such that that a path between the portable device and access point is clear of local obstructions. The second desirable reason is that it is generally desirable to radiate energy away from a person's head for safety or health considerations (for example, see: http://hps.org/hpspublications/articles/rfradiation.html regarding present day portable radio systems). By having a steerable antenna avoid radiating into a person or structure, safety precautions may be taken while enabling a more predictable signal strength.

In this invention, a smartphone or cellphone/computing device (herein called a "portable wireless device" or "wireless portable device", both terms being interchangeable) uses one or more internal sensors to sense parameters indicative, for example, of how a person is holding the smartphone or cellphone/computing device, and adjusts the transmission beam pattern to ensure that the primary energy radiated by the portable wireless device is radiated away from the person using the portable wireless device.

Sensing of the parameters of the portable wireless device which may be used to ensure energy is radiated from the portable wireless device, e.g., away from the user, may be accomplished in many ways using one or parameter sensors 29, e.g. FIG. 2, which are built in, added on, or are otherwise associated with the portable wireless device. The choice of sensor 29 and location can vary widely and may include, e.g., without limitation, cameras, heat sensors, gyroscopes, light detectors, capacitive detectors (including capacitive elements of a capacitive touch interface of a portable wireless device), microphones, and ultrasound sensors or transducers.

One method is to use a sensor such as a built in camera, used by a portable wireless device (e.g. smartphone or cellphone/computing device) to sense the presence of one or more persons. Having information as to the presence and relative location of a user or a user's body, and/or other surroundings, an antenna system of the portable wireless device can steer away from the detected user and/or other surroundings a primary beam or beams formed by the portable wireless device to avoid radiating the user.

Pattern recognition, facial recognition, or the use of the camera to sense hair, skin, body parts (such as eyes or ears, or heads, or arms), or clothing may be used to steer a beam or beams away from a user. The geometry of the portable wireless device, including the camera or cameras in the device, their locations and orientation on the device itself, and the physical orientation of the antenna may be used in determination of a direction to steer a beam or beams. Patterns for adaptive antennas may be controlled using a wide range of electrical switching, phasing, or selecting techniques known in the art and described elsewhere in this specification to enable pattern adjustments in two and three dimensions. Since a human being moves at a much slower rate than adaptive antennas can beamform or steer beams, antenna beam patterns may be adjusted in real time (at least as fast, and actually much faster, than as a person moves) to maintain a primary beam or beams radiating away from a user during continued use of the portable wireless device. Note that multiple cameras on the device may be used to determine approximate distances of a user from the device (as can other methods and systems described below), which may be used to then determine fields of view or zones or spans of directions where energy should not be radiated by a steerable beam of the device.

By using simple geometry calculations, accounting for the camera's field of view (used to sense the human user and/or the user's body parts or clothing, etc.) and the orientation of the antenna elements in a portable wireless device, a zone or span of directions can be computed by the device (using a "beamformer" or "beamsteering" or "beam selection" approach, which may be implemented in software within the device, e.g. a computation module, or on a specialized processor or generalized processor such as processor 27 in FIG. 2, along with antenna and RF front end hardware to actuate the desired radiation pattern from antennas in the device, where computer algorithms are used to select proper hardware settings for desired beam patterns) to know where not to transmit energy, and the beamforming algorithms (which may include beam or antenna element selection, adaptive beamforming, beam selection, multibeam combining, mimo, phasing, etc.) may be adjusted to ensure that a primary energy is radiated away from the zone or span of directions.

In addition to camera sensors, other parameter sensors such as gyroscopes, light detectors, heat detectors, or capacitance detectors may be used to sense how or where a person is holding a device, moving a device, and may give indications as to where the device is oriented, so that the beamforming or beamsteering algorithms or approaches may, for example, radiate energy away from a human user. A gyroscope may be used, for example, to determine when the phone is being moved and signal the device to begin computing new orientations that would be applied to the beamformer, so that new zones of avoidance may be computed, such that an antenna beam or beams may be pointing away from the user as the device is moved.

Light detectors may be used to determine intensity of light to which a wireless portable device is exposed. When a wireless portable device is pressed up to a person's head, for example, the device may sense the difference between the head, and the hand, which may not completely cover the device. This difference, through preset or learned calibration routines, allows the wireless portable device to determine an orientation of the device relative the user's body, and resulting computation by the device involving estimation of the user's location may be fed to or used by the beamformer to allow the beamforming operation to compute, and recompute (as the device is moved, or in a periodic or non periodic fashion during transmission) primary beam directions that would avoid zones where the user is estimated to be.

One or more heat detectors may be used to determine how a human is holding a wireless portable device, how hands are positioned on the device, by sensing around a case of the device. Such heat detectors may be used explicitly for detecting thermal radiation to which an exterior of the portable wireless device is exposed, and not for detection of the thermal conditions inside the device, such as monitoring of circuitry temperature and overheating prevention. Heat detectors may also determine approximate distance of a human user's body from a device, by sensing a difference between ambient temperature and temperatures on different sides of the device. Using this approach, the device may determine, either alone or with other sensor inputs (e.g. sensor fusion, such as with cameras, or other sensors) where the user is located relative the device, and in particular the device's antennas. Information from one or more heat sensors and one or more other sensor inputs may be used computationally to determine special orientations of the user, and then the beamforming operation can use the computational outputs to allow the antenna beam or beams to be directed such as to radiate away from the user.

Similarly, one or more capacitive devices may be used to sense touch and/or proximity of a user's skin to a portable wireless device, and either alone or with sensor fusion, the portable wireless device can determine how to orient the one or more beams of the device to avoid radiating in the direction of the user.

Sensors may also include audio sensors or microphones, ultrasound transducers, or ultrasound range finders or sensors, working alone or in concert with other sensors (i.e. sensor fusion), or with multiple types of the same sensor, to provide stereoscopic or differential measurements to determine distance ranges between a portable wireless device to parts of a human body, or the presence of fingers or hands on the case or display of the portable wireless device to determine if certain antennas should even be used (e.g to avoid radiating when a finger or palm or head is directly over one or more antennas).

Note that beamforming operations may also be used to simultaneously find the best or sufficient beam pointing directions to ensure a link between the transmitter and receiver, while still avoiding radiation of energy toward a human user. It should be noted that for receiving signals, the same beam arrays used for transmitting might be used to point in a different direction (for example, on receive, the beam array may wish to point at a human user to pick up reflections off of the human body). In future mmWave wireless systems, time division duplexing may be likely, since the transmitter-receiver distances will likely shrink to a few hundred meters, allowing antenna arrays to be used partially for transmit and partially for receive, in a time division duplexed fashion, thereby allowing a device to provide different beam patterns on transmit than on receive. It is understood that as future mmWave wireless standard evolve, the beamforming computations need to be made within a time frame between successive time division transmissions. Thus a portable wireless device would need to be able to use sensory information to determine spatial zones of avoidance of the beamforming process, so that the computations and recomputations (as the device is moved) in a periodic or non periodic fashion between transmission slots (as indicated by the wireless standards created for mmWave wireless systems, are at least at a rate much greater than the movement of humans, so as to ensure that the primary beam directions would avoid the zones where the human would be estimated to be by the wireless portable device.

Figure 7:
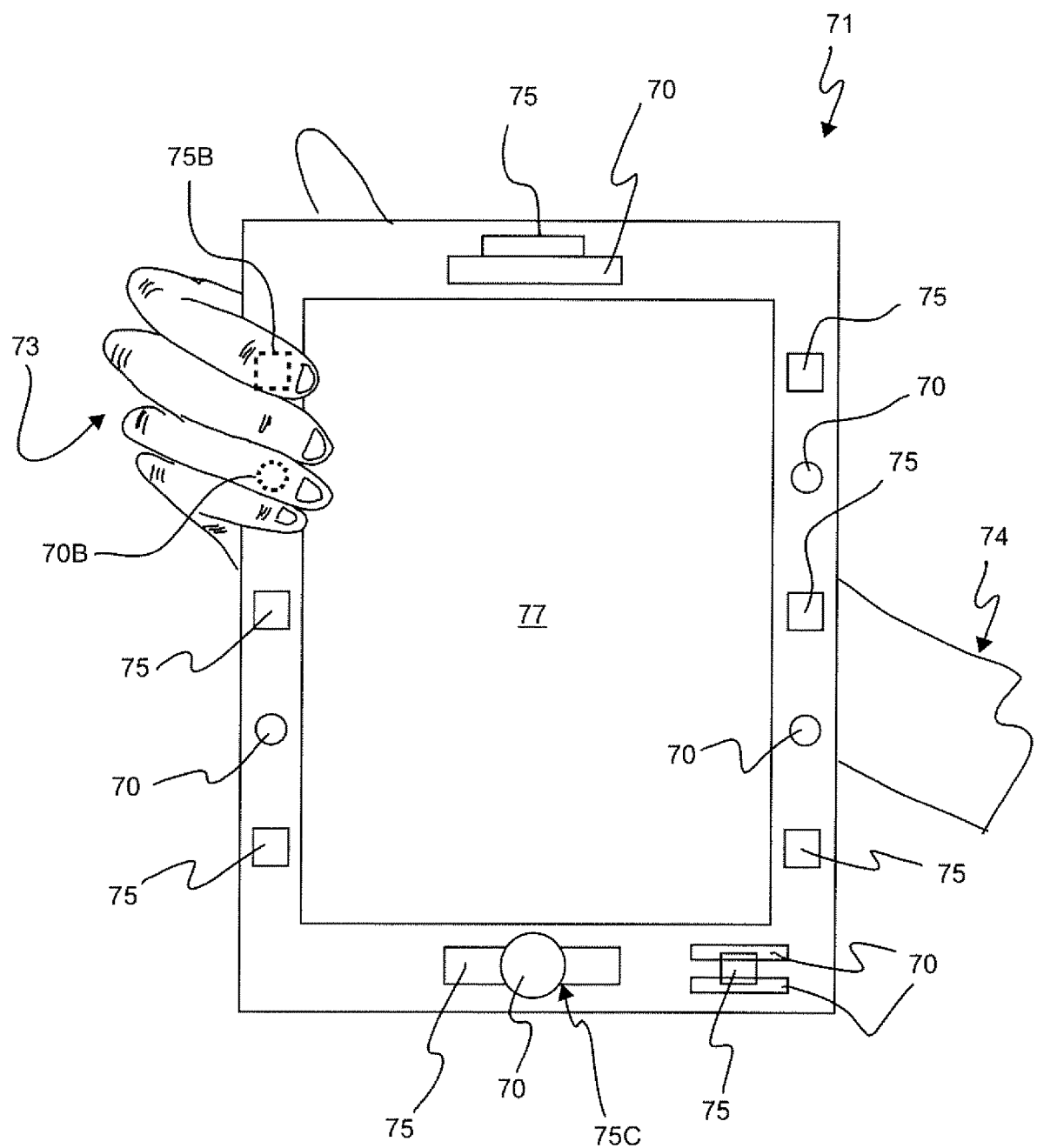
FIG. 7 shows a portable device with multiple antenna elements, where an antenna element is not activated when covered by a person's finger.

FIG. 7 shows an example of how sensors 70 may be used with a wireless portable device (e.g. phone or tablet 71) to determine the proximity of, for example, a hand and fingers 73 of a person 74 as the device is being held. Multiple embedded antenna elements 75 are usable to provide a steerable antenna beam. Sensors 70 detect one or more parameters which cause detection of the user's fingers 73 gripping a top left portion of the tablet 71. For example, a heat sensor 70B in an edge of the tablet or capacitive elements integral with display 77 detect the heat from and contact of fingers 73 with the tablet 71. Accordingly, antenna element 75B (shown in dashed lines as being under the user's fingers) which is not covered by a human finger is not activated and accordingly does not radiate outward from the face of the tablet. The configuration shown in FIG. 7 is simply an example. It should be understood that the number and configuration of sensors 70 and antenna elements 75 may vary from one device to another, and sensors and antenna elements may be combined with one another, as with sensor antenna/combination 75C, and/or with other circuitry or hardware elements of a portable wireless device 71.

Figure 8:
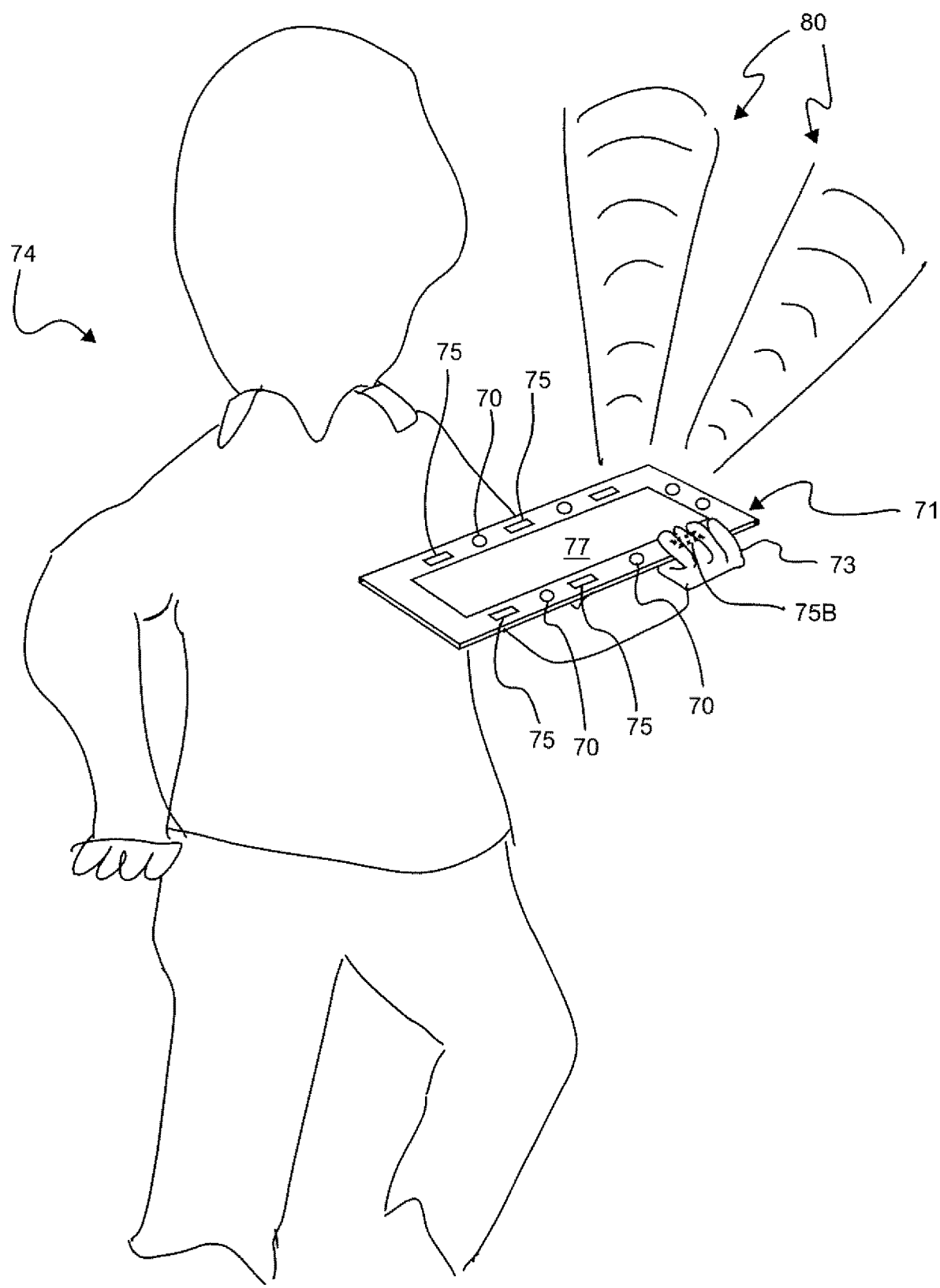
FIG. 8 shows a portable device with a steerable antenna, where the beams formed by the steerable antenna avoid radiating toward the user of the device.

FIG. 8 shows a person 74 holding a wireless portable device (e.g. a tablet 71). Sensors 70, which may be integral with, affixed to, or otherwise configured with tablet 71, collect data concerning the tablet's environment and state. The proximity, distance, and direction of a surrounding, such as person 74 and parts of his or her body, in three dimensional space relative the device can be estimated or determined, and the radiated antenna patterns/beams 80 of the device are steered or otherwise directed away from person 74 or any other detected person or structure by modulation and control of the radiation pattern of antenna elements 75. Antenna element 75B (shown dashed as being under the user's hand) is detected as being covered by fingers 73 and is deactivated, preferably until no obstruction by a person or part of a person or structure is detected. As a result, the user's fingers 73, as well as the user's body (i.e. torso, head, etc), are not radiated by energy from the antenna elements.

The above systems and methods for steering the beams away from a user, parts of a user's body, or one or more objects, may be implemented in a single band, or multiple bands, and may be used with a wide variety of devices, with one or more sensors, multiple screens, and for use in wireless communication systems where antenna beams may be formed by multiple antenna elements, preferably at mmWave frequencies at or above 10 GHz. "Avoidance zones", to ensure primary radiation away from a human user, may be one or more directions, or zones or angles that are computed by a device.

It should be clear that other sensors, not yet developed, could also be used to allow a wireless portable device to avoid radiating a human user, and such sensors could be used to follow the movements of the user to ensure the device could implement beamforming or beamsteering that continue to avoid radiating energy in the direction of the user or parts of the user's body. Also, all of the systems and methods described above may also be applied to fixed wireless devices and infrastructure used in wireless systems, as well, where repeaters or access points or base stations and the like would be deployed in or around dwellings, malls, or locations where humans are or move near. Similarly, to allow for rapid deployment of fixed infrastructure, the above approaches may be used to allow fixed infrastructure to automatically steer beams in a manner to avoid buildings, structures, or objects that could otherwise interfere with a more desired or optimal beam pattern.

It should be evident that the invention contemplated here, while described as a single antenna, may itself be implemented with other antennas or antenna elements or sub elements to form an antenna array, including for use in a MiMO system or beam switchable array, and that the disclosed invention with single antenna which may have one or more elements or antennas and which may be implemented in a lumped or distributed or passive or active or hybrid manner, and may be used in conjunction with other antennas in various switching, phasing, or active or passive combining techniques to form a larger or distributed antenna structure that also works over multiple frequencies. The invention extends to components such as the tuner and/or controller for implementing the invention. For example, tuners or sets of tuners which are connectable or coupled to multiple transmitters, receivers, or transceivers for allowing the simultaneous transmission or reception at multiple frequency bands or the ability to use a single physical structure (e.g., an antenna) for transmission and reception of many different bands, or controllers or other circuitry for accomplishing the same form a part of this invention.

I claim:

1. A method for avoiding radiation of a user or structure by a wireless device having at least one steerable antenna, comprising the steps of:
   detecting in a three dimensional space, using one or more cameras, microphones, audio sensors, ultrasound sensors or transducers, range finders, capacitive sensors, gyroscopes, light detectors, or motion detectors, an orientation of said wireless device relative to either or both said user and said structure;
   determining zones or spans of directions in the three dimensional space corresponding with one or more directions of either or both said user and said structure relative to said at least one steerable antenna; and adjusting one or more beam radiation patterns of said at least one steerable antenna to radiate in one or more directions which are not in said zones or spans of directions in the three dimensional space, wherein said at least one steerable antenna is configured to steer or direct its energy in particular directions while providing nulls or dead zones in other directions, and wherein said adjusting step adjusts the one or more beam radiation patterns for direction of energy to one or more of said particular directions while avoiding said zones or spans of directions in the three dimensional space, and wherein said at least one steerable antenna operates on one or multiple bands and radiates at one or more frequencies in the range of 10 GHz to 500 GHz.

2. The method of claim 1, wherein said detecting step comprises one or more of:

capturing one or more images with at least one camera;

detecting ambient light or blockage thereof with at least one light sensor;

detecting motion of said wireless device with at least one gyroscope;

detecting one or more of audio or ultrasonic signals relating to the orientation of the user or structure with one or more of a microphone, ultrasonic sensor, or ultrasonic transducer; and detecting relative position of the user or structure with at least one capacitive sensor.

3. The method of claim 1 wherein a directional radiating pattern of said one or more beams is different from a receiving pattern used in said step of receiving said signals.

4. The method of claim 1 further comprising a step of receiving signals arriving from one or more directions that are within said zones or spans of directions of said user or structure.

5. The method of claim 1 wherein said at least one steerable antenna or said another antenna uses one or more of: beamforming, beamsteering, beam or antenna element selection, adaptive beamforming, multibeam combining, MIMO, phasing, beam switchable array, active combining, passive combining, and hybrid antenna structure.

6. The method of claim 1, wherein a directional radiating pattern of said one or more beams is different from a receiving pattern used in said step of receiving said signals.

7. The method of claim 6 further comprising using time division duplexing for communication, using said one or more beams radiated by said at least one steerable antenna and signals received by at least one of said at least one steerable antenna.

8. The method of claim 6 wherein said step of receiving signals with said at least one steerable antenna receives said signals arriving from one or more directions that are within said zones or spans of directions of said user or structure.

9. The method of claim 1 wherein the at least one steerable antenna operates on multiple bands.

10. The method of claim 1, and wherein said steps of detecting, determining, and adjusting are performed multiple times as said one or more parameters change over time.

11. A wireless device for avoiding radiation of a user or structure, comprising:

one or more sensors selected from the group consisting of cameras, microphones, audio sensors, ultrasound sensors or transducers, range finders, capacitive sensors, gyroscopes, light detectors, or motion detectors configured to detect in a three dimensional space an orientation of said wireless device relative to either or both said user and said structure;

one or more processors communicatively coupled to said one or more sensors;

at least one steerable antenna communicatively coupled to said one or more processors wherein said at least one steerable antenna is configured to adjust a beam radiation pattern so as to steer or direct its energy in particular directions while providing nulls or dead zones in other directions, wherein said at least one steerable antenna radiates at one or more frequencies in the range of 10 GHz to 500 GHz; and a non-transitory computer readable medium comprising executable instructions that when executed by said one or more processors cause said one or more processors to perform the steps of:

receiving signals from said one or more sensors pertaining to said orientation in the three dimensional space;

using said signals, computing zones or spans of directions corresponding with one or more directions of either or both said user and said structure relative to said at least one steerable antenna in the three dimensional space; and adjusting one or more beam radiation patterns of said at least one steerable antenna to radiate in one or more directions of said particular directions which are not in said zones or spans of directions in the three dimensional space, wherein said at least one steerable antenna radiates said one or more beams based on signals from said one or more processors determined on execution of said executable instructions, and wherein said at least one steerable antenna operates on one or multiple bands; and a receiver for receiving over-the-air signals.

12. The wireless device of claim 11, wherein said at least one steerable antenna comprises a plurality of steerable antennas.

13. The wireless device of claim 11, wherein said one or more sensors includes one or more cameras, gyroscopes, light or motion detectors, capacitive sensors, microphones, and ultrasound sensors or transducers.

14. The wireless device of claim 11, wherein said one or more parameters are selected from the group consisting of light, motion, orientation, video, capacitance, ultrasound, and sound.

15. The wireless device of claim 11 wherein a directional radiating pattern of said one or more beams radiated from said at least one steerable antenna is different from a receiving pattern of said at least one steerable antenna.

16. The wireless device of claim 11 wherein said receiver receives said over-the-air signals in one or more directions that are within said zones or spans of directions of said user or structure.

17. The wireless device of claim 11 wherein said at least one steerable antenna or said receiver uses one or more of: beamforming, beamsteering, beam or antenna element selection, adaptive beamforming, multibeam combining, MIMO, phasing, beam switchable array, active combining, passive combining, and hybrid antenna structure.

18. The wireless device of claim 11, wherein a directional radiating pattern of said one or more beams radiated from said at least one steerable antenna is different from a receiving pattern used by said at least one steerable antenna or said receiver used to receive said over-the-air signals.

19. The wireless device of claim 18 wherein said wireless device is configured for time division duplexing for communication, using said one or more beams radiated by said at least one steerable antenna and using over-the-air signals received by at least one of said at least one steerable antenna or said receiver.

20. The wireless device of claim 18 wherein said receiver receives signals in one or more directions that are within said zones or spans of directions of said user or structure.

21. The wireless device of claim 11 wherein the at least one steerable antenna operates on multiple bands.

22. The wireless device of claim 11 wherein said executable instructions cause said steps of receiving, using, and adjusting to be performed multiple times as said one or more parameters change over time.

23. A steerable antenna system for avoiding radiation of a user or structure by a wireless device, comprising:
- one or more sensors configured to detect in a three dimensional space using one or more cameras, microphones, audio sensors or transducers, ultrasound sensors, range finders, capacitive sensors, gyroscopes, light detectors, or motion detectors, an orientation of said wireless device relative to either or both said user and said structure;
- a computation module communicatively coupled to said one or more sensors configured to determine zones or spans of directions;
- at least one steerable antenna that radiates at one or more frequencies in the range of 10 GHz to 500 GHz communicatively coupled to said computation module, said at least one steerable antenna being configured for adjustably radiating one or more beams in one or more directions which are not in said zones or spans of directions in the three dimensional space,
- wherein said zones or spans of directions correspond with one or more directions of said user or structure relative to said at least one steerable antenna in the three dimensional space,
- wherein said at least one steerable antenna is configured to adjustably steer or direct its energy in particular directions while providing nulls or dead zones in other directions in the three dimensional space,
- wherein said at least one steerable antenna operates on one or multiple bands; and
- a receiver for receiving signals.

24. The steerable antenna system of claim 23, wherein said at least one steerable antenna comprises a plurality of steerable antennas.

25. The steerable antenna device of claim 23, wherein said one or more sensors includes one or more cameras, gyroscopes, light or motion detectors, capacitive sensors, microphones, and ultrasound transducers.

26. The steerable antenna device of claim 23, wherein said one or more parameters are selected from the group consisting of light, motion, orientation, video, capacitance, ultrasound, and sound.

27. The steerable antenna system of claim 23 wherein a directional radiating pattern of said one or more beams radiated from said at least one steerable antenna is different from a receiving pattern of said at least one steerable antenna.

28. The steerable antenna system of claim 23 wherein said receiver using said at least one steerable antenna or said receiver receives signals in one or more directions that are within said zones or spans of directions of said user or structure.

29. The steerable antenna system of claim 23 wherein said at least one steerable antenna or said receiver uses one or more of: beamforming, beamsteering, beam or antenna element selection, adaptive beamforming, multibeam combining, MIMO, phasing, beam switchable array, active combining, passive combining, and hybrid antenna structure.

30. The steerable antenna system of claim 23,
- wherein a directional radiating pattern of said one or more beams radiated from said at least one steerable antenna is different from a receiving pattern used by said at least one steerable antenna or said receiver.

31. The steerable antenna system of claim 30 wherein the steerable antenna system is configured for time division duplexing for communication, using said one or more beams radiated by said at least one steerable antenna and signals received by at least one of said at least one steerable antenna or said receiver.

32. The steerable antenna system of claim 30 wherein said receiver receives signals in one or more directions that are within said zones or spans of directions of said user or structure.

33. The steerable antenna system of claim 23 wherein the at least one steerable antenna operates on multiple bands.

* * * * *